H. L. LITCHFIELD.
COMBINATION MANURE AND STRAW SPREADER.
APPLICATION FILED MAY 7, 1919.
1,347,583.
Patented July 27, 1920.
4 SHEETS—SHEET 1.
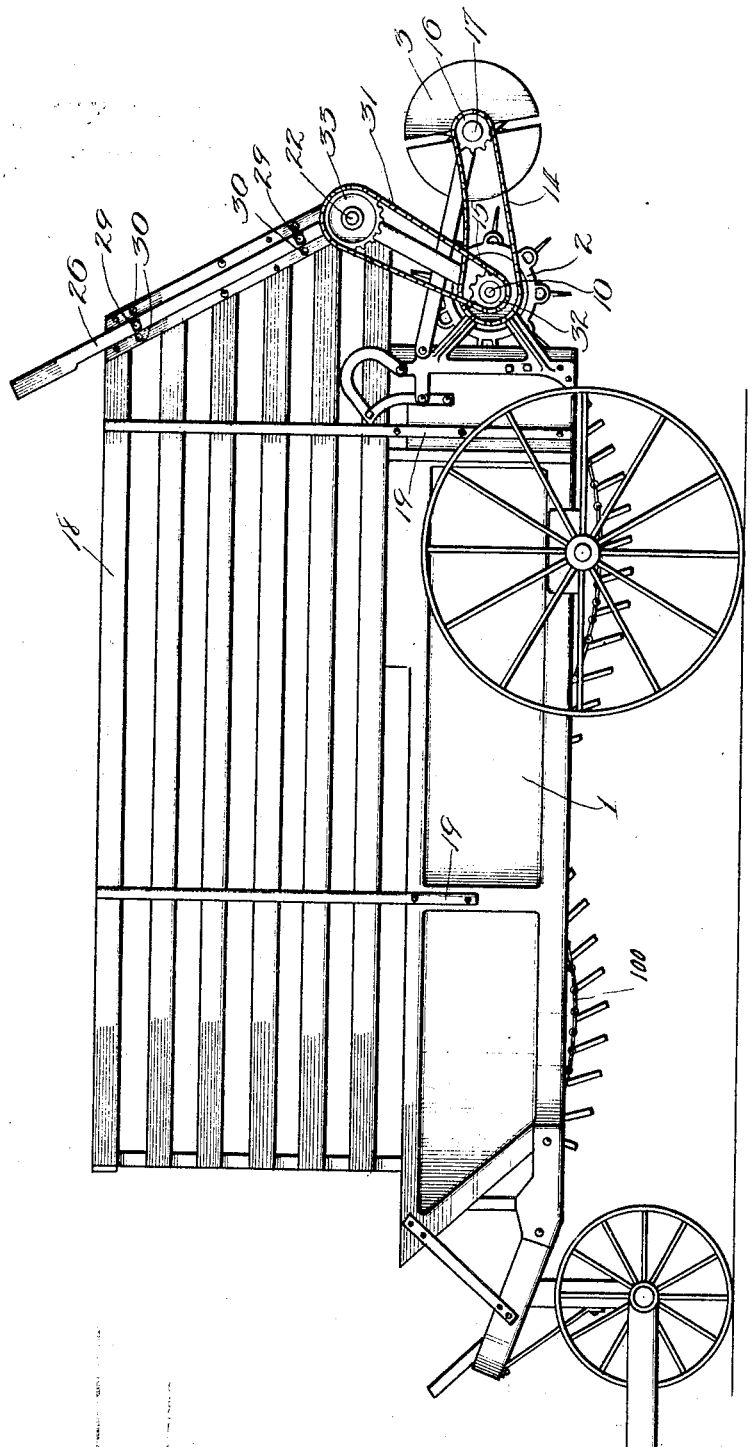

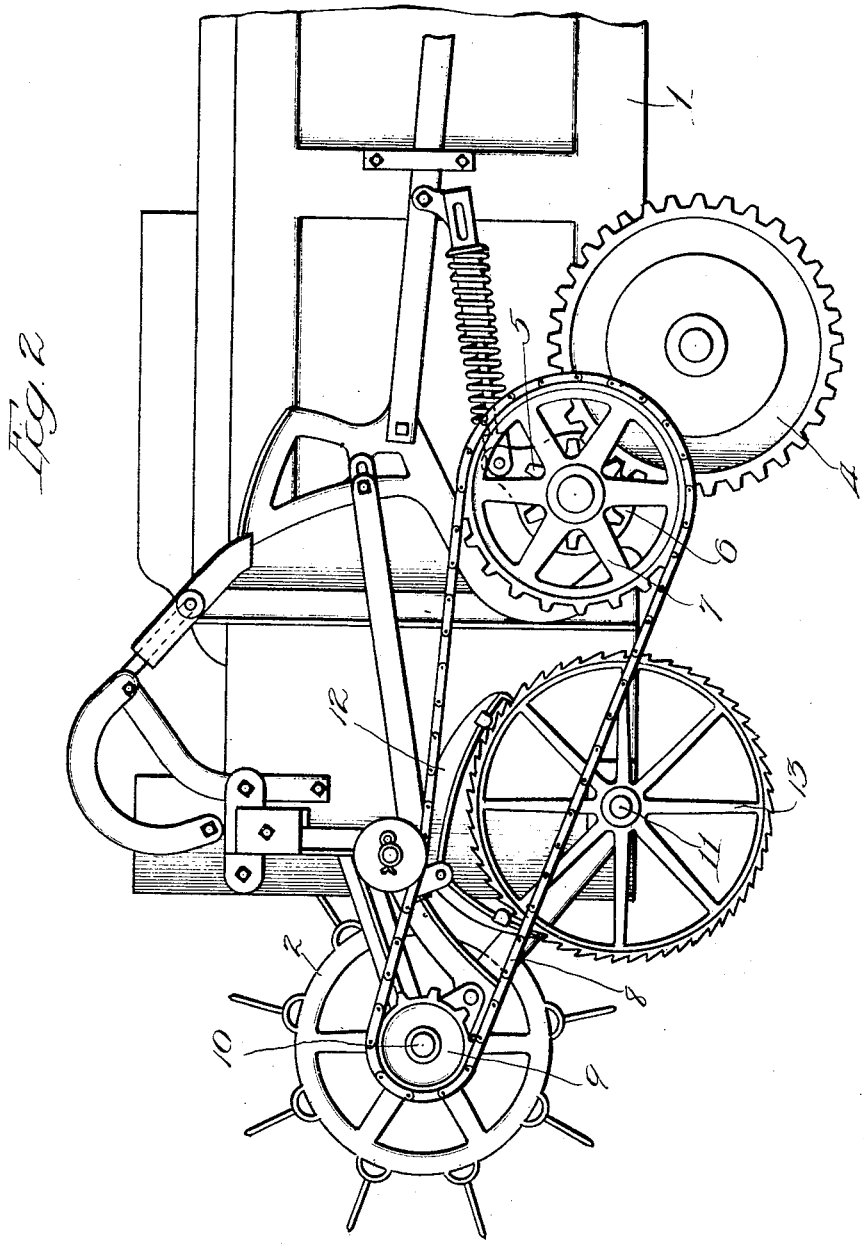

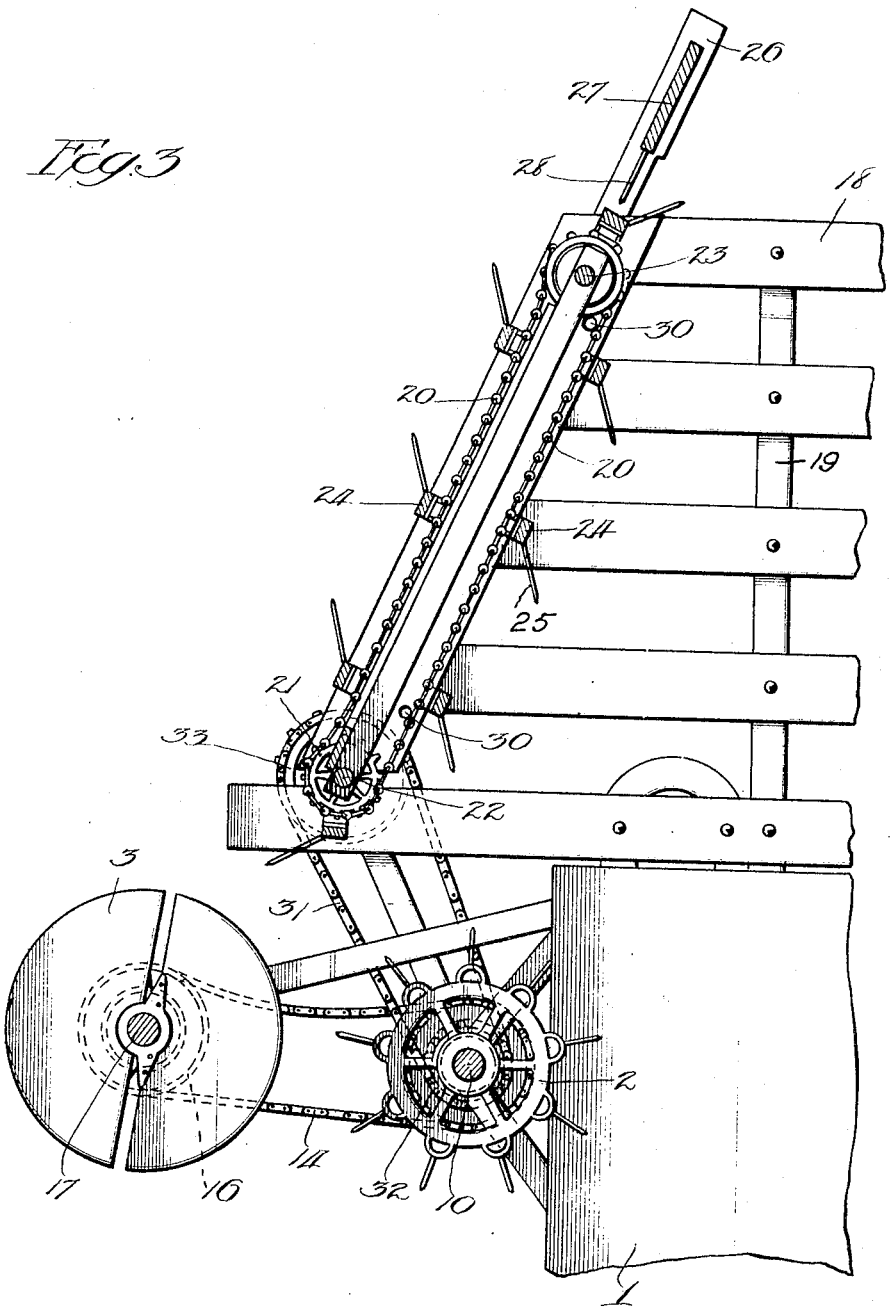

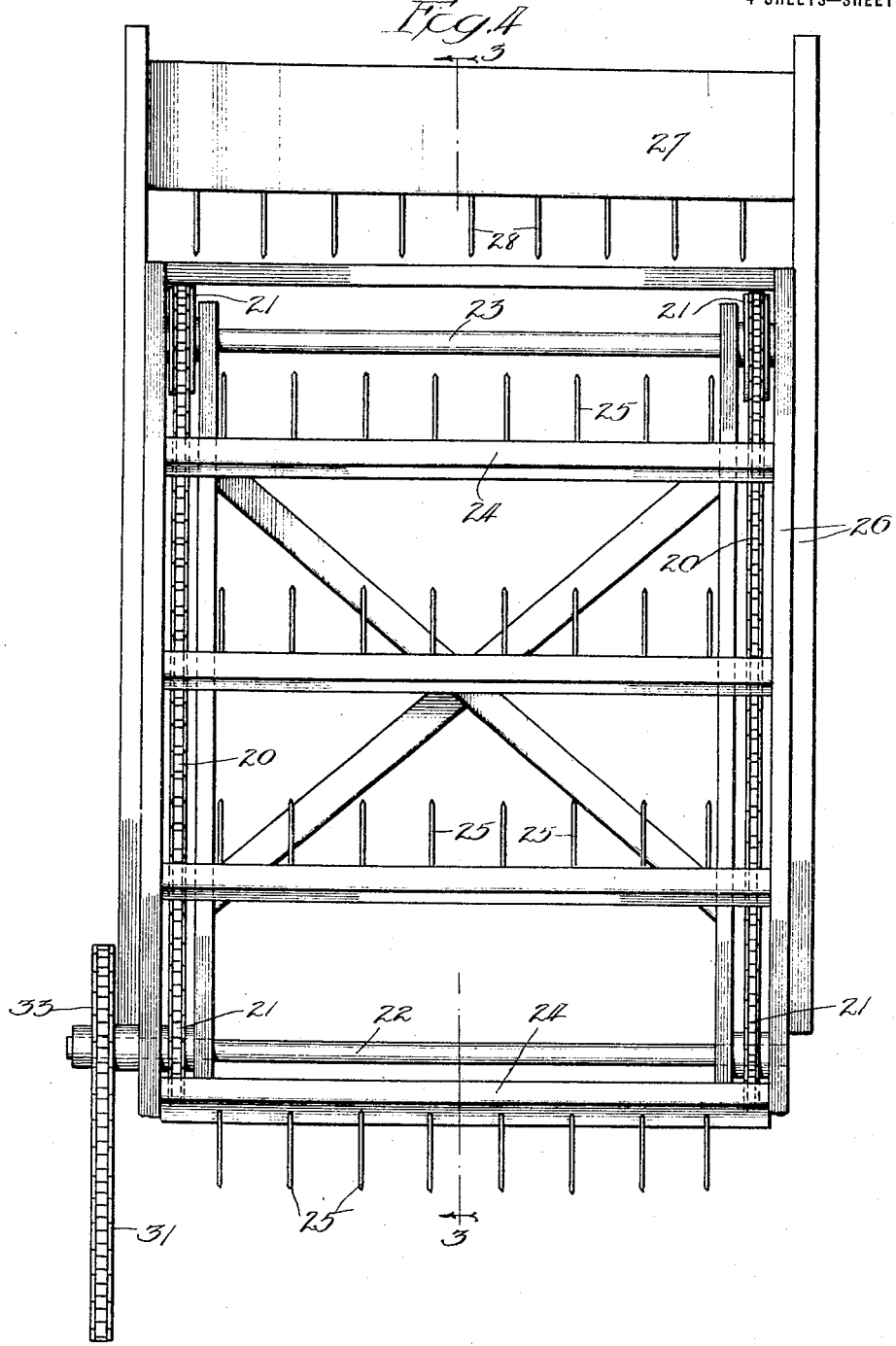

UNITED STATES PATENT OFFICE.

HENRY L. LITCHFIELD, OF WATERLOO, IOWA.

COMBINATION MANURE AND STRAW SPREADER.

1,347,583.  Specification of Letters Patent.  Patented July 27, 1920.

Application filed May 7, 1919. Serial No. 295,285.

*To all whom it may concern:*

Be it known that I, HENRY L. LITCHFIELD, a citizen of the United States, residing at Waterloo, county of Blackhawk, State of Iowa, have invented a certain new and useful Improvement in Combination Manure and Straw Spreaders, and declare the following to be a full, clear, and exact description of the same, such as will enable others skilled in the art to which it pertains to make and use the same, reference being had to the accompanying drawings, which form a part of this specification.

The ordinary manure spreader is not adapted for distributing light material such as straw; spreaders differing radically from each other being required to handle such widely different materials as clean straw and heavy manure containing little or no straw. It is not always possible or economical for a farmer to possess two different spreaders and it therefore often becomes necessary to dispense with one or the other.

One of the objects of the present invention is to produce a spreader of universal utility which may be employed for spreading light materials such as clean straw, heavy materials such as manure containing little or no straw and, of course, materials varying in character between these extremes.

In carrying out the invention, an efficient type of manure spreader may be employed as the basis for the combination spreader, attachments being added to adapt the spreader for use in connection with the lighter materials. Therefore, viewed in one of its aspects, the present invention may be said to have for its object to produce a simple and novel attachment for a manure spreader which will permit it to operate efficiently as a straw spreader.

The present invention embodies novel features in the method and means for handling straw or other similar material and therefore, viewed in another of its aspects, the invention may be said to have for its object to produce a simple and novel method of and mechanism for distributing straw.

The various features of novelty whereby the present invention is characterized will hereinafter be pointed out with particularity in the claims; but, for a full understanding of the invention and of its objects and advantages, reference may be had to the following detailed description taken in connection with the accompanying drawings, wherein:

Figure 1 is a side elevation of a combination spreader arranged in accordance with the present invention;

Fig. 2 is a side elevation, on a larger scale, of the rear end of the spreader, showing the opposite side from that which appears in Fig. 1, the straw spreading attachments being omitted;

Fig. 3 is a vertical longitudinal section through the rear end of the complete spreader; and Fig. 4 is a rear elevation of the raking conveyer forming part of the straw spreading attachment.

In the drawings the spreader is illustrated as being made up of an apparatus heretofore used for a manure spreader, attachments being added to permit the effective handling of straw; and, for the sake of brevity, the detailed description will be confined to this particular embodiment of the invention, although the latter is not limited to such specific embodiment.

The manure spreader chosen for the sake of illustration is that described in detail in United States Patents Nos. 1,267,563 and 1,294,496 and the details thereof need be explained only briefly herein.

Referring to the drawings, 1 represents the wheeled body of a manure spreader the bottom of which is formed of a traveling apron or belt, 100. The rear end of the body is open and, lying just behind it is a revoluble beater wheel, 2, beyond which is placed a broadcast spreading device, 3. The traveling apron or belt, the beater wheel, and the broadcast spreading device are all driven from one of the rear wheels of the spreader, the primary driving connections, as best shown in Fig. 2, being as follows: A gear wheel, 4, is attached in any suitable manner, not shown, to one of the rear wheels of the spreader. Through a suitable pinion, 5, and clutch device, 6, the gear wheel drives a sprocket wheel, 7, which, through a sprocket chain, 8, passing over a sprocket wheel, 9, on the shaft, 10, of the beater wheel, drives the latter in the opposite direction from that in which the vehicle wheels turn. The traveling apron forming the bottom of the spreader body is driven from a transverse shaft, 11, at the rear end of the spreader, conveniently through a suitable pawl mechanism, 12, acting on a ratchet wheel, 13, secured to the shaft 11; the pawl mechanism being driven from the beater wheel shaft. The parts are so proportioned that as the vehicle moves forward, the upper run of the traveling apron moves slowly toward the rear.

The broadcast spreader is driven by means of a sprocket chain, 14, passing over sprocket wheels, 15 and 16, secured respectively to the beater wheel shaft and to the shaft, 17, of the broadcast spreader; the broadcast spreader being caused to rotate in the same direction as the beater wheel.

All of the parts heretofore specifically described are well known.

One of the requirements of a straw spreader is a body or rack much larger than the vehicle body required for a manure spreader, because of the lightness of straw. In order to give the necessary increased holding capacity to the body of the manure spreader there is mounted upon it a comparatively high rack, 18, which may be provided with uprights or posts, 19, extending down past the sides of the member 1 and secured thereto in any suitable manner. If detachably secured by simple means, the rack or extension may be removed when the spreader is being used to spread manure.

The rear end of the rack extends beyond the rear end of the body 1, preferably entirely across the top of the beater wheel. The rear end of the rack is closed by means of what may be termed an endless rake, consisting of any desired number of endless chains or belts, 20, passing over sprocket wheels or pulleys, 21, secured to shafts, 22 and 23, arranged respectively in the vicinity of the lower portion and near the top of the rack; the chains being connected at intervals by transverse slats, 24, from which project fingers or teeth, 25. The raking conveyer may be supported in a suitable frame, 26, attached to the rear end of the rack, preferably in an adjustable manner, so as to permit the device to be shifted somewhat. Above the upper shaft of the raking device is a transverse plate or guard, 27, spaced far enough away from the shaft to clear the teeth of the endless rake when the latter makes the turn at the top. The guard may be and preferably is provided with teeth or fingers, 28, which project down between the teeth or fingers of the rake.

The parts are so proportioned that the lower portion of the traveling rake lies a considerable distance behind the vertical plane containing the axis of the beater wheel, the rake as a whole being inclined forwardly as the top of the rack is approached. By making the connection between the supporting frame for the rake and the rack adjustable, the rake may be bodily shifted, or it may be shifted so as to change the angle at which it stands to the vertical. Any suitable adjusting means may be provided for this purpose. In the arrangement shown, (see Fig. 1,) the bolts, 29, by means of which the frame is attached to the rack may each be inserted through any one of a plurality of holes, 30, in the rear end of the rack.

The endless rake is driven by means of a sprocket chain, 31, passing over sprocket wheels, 32 and 33, secured respectively upon the beater shaft and the shaft, 22, of the rake; the parts being so constructed and arranged that when the vehicle is moving forward, so that the elements at the top of the beater wheel are moving rearwardly and the traveling apron forming the bottom of the body is moving toward the rear, the inner run of the raking conveyer is traveling upwardly.

Assuming that the spreader is filled with straw, that it is moving ahead across a field, and that the clutch is in: It will be seen the slowly moving apron forming the bottom of the body carries the entire mass slowly toward the beater wheel and the endless rake. That portion of the rake in contact with the oncoming rear wall of the mass of straw is moving upwardly, raking the straw from the rear of the mass and delivering it upon the top, while the beater wheel is feeding the extreme lower portions of the rear end of the mass of straw upwardly to the rake and at the same time carrying some of the straw out through the gap between it and the rake and delivering it to the broadcast spreader which scatters the straw. As the straw continues to be fed upon the top of the mass in the spreader, the top is progressively pushed toward the front of the spreader so that the movement of the entire mass is in the nature of a slow rolling movement; the volume of the straw being gradually diminished by a progressive peeling away of a thin layer from the exterior thereof as the ball-like mass becomes smaller and smaller. There can be no bunching of the material at the beater wheel or clogging of the mechanism because any material that is not immediately discharged by the beater wheel will be carried away by the rake, to be brought back again after it has traveled across the top of the mass toward the front of the spreader and down again to the bottom. In other words, the straw is progressively fed past the disintegrating and discharging device which takes as much as it wants or can and allows the remainder to continue its travels in the spreader.

The pawl and ratchet device permits the speed of the traveling apron to be varied relatively to the speed of the other mechanisms, so that any desired relation may be maintained between the rate at which the straw is presented to the beater wheel and the rate at which the latter distributes it.

It will be noted that the function of the guard above the endless rake is to prevent the rake from carrying the straw along with it around the upper portion, by stripping the rake of any accumulation of straw and forcing the straw to remain in the rack.

The improvements herein disclosed have been described as applying to the distribution of straw. There is of course usually more or less straw or other fibrous material in manure and there is a wide range between ordinary clean straw on the one hand and almost solid compact manure on the other hand. It will of course be understood that the invention is not limited to use in connection with clean straw or the like, alone, but is adapted to distribute any mass of loose material, even manure containing very little straw or the like. In fact, any material which is apt to contain lumps or bunches that may perhaps not be effectively disintegrated by ordinary beater wheels or the like, can be thoroughly broken up and scattered in the form of a light stream, through the action of carrying the lumps or bunches past the beater wheel or the like and then bringing them back again so as to permit progressive disintegration thereof.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. The method of progressively converting a mass of loose material into a light stream of scattered elements, which consists in moving the mass toward a disintegrating and scattering device with a slow rotary motion.

2. The method of progressively converting a mass of loose material into a light stream of scattered elements, which consists in moving the mass toward and against a disintegrating and scattering device and simultaneously producing a movement principally upward to the top of the mass on the side adjacent to said device.

3. The method of progressively converting a mass of loose material which is apt to contain lumps or bunches into a light stream of scattered elements, which consists in moving the mass toward a disintegrating and scattering device and simultaneously applying a force tending to revolve the mass.

4. The method of distributing a mass of loose material which consists in moving the mass past a discharge point with a slow rotary motion and causing portions of the material to be discharged upon reaching said point.

5. The method of distributing a mass of loose material which consists in moving the mass past a discharge point with a slow rotary motion and progressively taking increments from said mass and distributing them as new portions of the mass pass said discharge point.

6. The method of feeding the contents of a spreader adapted to be distributed from one end thereof, which consists in moving the contents toward the distributing end of the spreader, and at the same time applying a force at said end tending to produce an upward movement of said contents and thus rotate the mass.

7. The method of feeding the contents of a spreader having a distributer at one end thereof which consists in applying to said contents forces tending to move said contents toward said end and at the same time and while in contact with said distributer tending to move said contents in a general upward direction in the vicinity of said distributer.

8. The method of distributing the contents of a spreader, which consists in applying forces to said contents tending to move them as a body against and then upwardly past a distributing device adapted to take and discharge increments of each new portion of the contents presenting itself.

9. In a spreader, a distributer at one end thereof, and means for moving the contents of the spreader so as to cause them to travel while in contact with said distributer in a general upward direction in the vicinity of the distributer.

10. In an apparatus of the character described, a distributing device, and means for moving the mass to be distributed slowly toward and against said device and in a general upward direction adjacent to said device.

11. In an apparatus of the character described, a disintegrating and scattering device, means for slowly moving a mass to be distributed toward said device, and means tending to give to said mass a slow rolling motion.

12. In an apparatus of the character described, a disintegrating and scattering device, means for slowly moving a mass of material toward said device, and means for acting on the mass in the vicinity of said device and tending to move the material in a direction generally upwardly from said device as it is fed by the aforesaid means.

13. In a spreader, a distributer, and means acting on the contents of the spreader tending to move the top and bottom of the mass slowly and uniformly in opposite directions one of which is toward the distributer.

14. In a spreader, a distributer at one end thereof, and means for feeding the contents of the spreader toward said device and at the same time giving them a slow rotary motion in a direction causing the bottom of the contents to travel toward said device.

15. In combination, a vehicle body, a distributing device at one end of said body, and mechanism for feeding a load in said body slowly toward said device and at the same time giving the load a slow revolving movement about a transverse axis.

16. In combination, a vehicle body adapted to contain a mass of material to be distributed, a distributing device at one end of said body, means for feeding the entire mass slowly toward said device, and means extending upwardly from said device for feeding material coming in contact therewith upwardly to the top of the mass.

17. In combination, a vehicle body adapted to support a mass of material to be distributed, a distributing device at one end of said body, means for moving said entire mass slowly toward said device, and means arranged above said device for feeding the advancing material inwardly and to a much greater extent upwardly to the top of the mass.

18. In a spreader, a distributer adapted to act directly on the contents of the spreader, an endless conveyer arranged in the vicinity of the distributer and extending upwardly therefrom and movable in a direction tending to carry the contents of the spreader upwardly and away from the distributer.

19. In a spreader, a distributer at the rear end thereof, and an endless upright conveyer forming with the distributer the rear wall of the spreader and having its inner run movable in the upward direction when the spreader is moving ahead.

20. The combination with a complete manure spreader, of an attachment comprising a rack or extension adapted to be placed upon the vehicle body of the spreader, an endless conveyer forming the rear end of said rack, and means for connecting said conveyer to the operating mechanism of the spreader so as to cause the inner run of the conveyer to travel in an upward direction.

21. In combination, a vehicle body open at one end and adapted to support a mass of material to be distributed, a distributing device arranged at said end near the lower regions of said body, means for moving said entire mass slowly toward said device, and a raking device arranged at said end above said distributing device for feeding the oncoming material in a general upward direction toward the top of the mass.

22. In combination, a vehicle body open at one end and adapted to support a mass of material to be distributed, a distributing device arranged at said end in the vicinity of the lower regions of said body, an endless movable rake arranged at said end above said device, the inner run of said rake being adapted to move in the upward direction when said device is in operation, and means for moving said mass as a whole slowly toward said device and said rake.

23. In combination, a vehicle body open at one end and adapted to support a mass of material to be distributed, a distributing device arranged at said end in the vicinity of the lower regions of said body, an endless movable rake arranged at said end above said device, the parts being so constructed and arranged that the inner run of said rake travels upwardly and inwardly with relation to said body when said device is in operation, and means for moving said mass as a whole slowly toward said device and said rake.

24. In combination, a vehicle body open at one end and adapted to support a mass of material to be distributed, a distributing device arranged at said end in the vicinity of the lower regions of said body, means for slowly moving said mass as a whole toward said end, and means arranged above and beyond the inner portions of said device for feeding material from the oncoming mass in a general upward direction toward the top of the mass.

25. The combination with a complete manure spreader, of an attachment comprising a rack or extension to be placed upon the vehicle body of the spreader, and means at the rear end of said rack for producing an upward movement in the rearmost portions of the contents of the spreader and rack.

26. The combination with a complete manure spreader, of an attachment comprising a rack or extension adapted to be placed upon the vehicle body of the spreader, and an endless conveyer arranged at the rear end of the rack and adapted to have its inner run travel in an upward direction when the spreader is in operation.

27. An attachment for a manure spreader having means for feeding the load toward the rear, comprising a rack or extension adapted to be placed upon the vehicle body, and means associated with said rack for coöperating with the aforesaid means in the spreader for creating a slow rotary motion of the contents of the spreader and rack.

28. An attachment for a manure spreader comprising a rack or extension adapted to be placed upon the vehicle body of the spreader, and means associated with said rack or extension adapted to coöperate with the feeding means in the spreader to tend to cause the contents of the spreader body slowly to move rearwardly and upwardly beyond the discharge point.

29. An attachment for a manure spreader having a distributer and means for feeding the contents of the spreader toward the distributer, comprising a rack or extension adapted to be placed upon the vehicle body of the spreader, and means coöperating with the aforesaid feeding means to cause the contents of the spreader to be fed rearwardly and in an upward direction in contact with the distributer more rapidly than the material is distributed by the latter.

30. An attachment for a manure spreader, comprising a rack or extension to be placed upon the vehicle body of the spreader, an endless rake forming the rear end of said rack, and means for effecting a driving connection between the distributing device of the spreader and said rake.

31. In combination, a vehicle body open at one end and adapted to support a mass of material to be distributed, a beater wheel arranged at said end in the vicinity of the lower regions of said body, and a rake arranged above said beater wheel and constructed and arranged to move in a general upward direction.

32. In combination, a vehicle body open at one end and adapted to support a mass of material to be distributed, a beater wheel arranged at said end in the vicinity of the lower regions of said body, and an upwardly-movable rake arranged above said beater wheel at a point outwardly beyond the axis of the latter.

33. In combination, a vehicle body open at one end and adapted to support a mass of material to be distributed, a beater wheel extending across said end in the vicinity of the lower regions of said body, an endless rake arranged above said beater wheel, the parts being so constructed and arranged that the inner run of said rake travels upwardly when the beater wheel is in operation, and means for feeding said mass toward said beater wheel and said rake.

34. In combination, a vehicle body open at one end and adapted to support a mass of material to be distributed, a beater wheel extending across said end in the vicinity of the lower regions of said body, an endless rake arranged above said beater wheel, the parts being so constructed and arranged that the inner run of said rake travels upwardly and inwardly when the beater wheel is in operation, and means for feeding said mass toward said beater wheel and said rake.

35. In combination, a vehicle body adapted to support a mass of material to be distributed, a beater wheel extending across one end of said body in the vicinity of the lower regions thereof, an endless conveyer arranged above the beater wheel, and driving connections causing the inner elements of the beater wheel and the inner run of the conveyer to travel in the same direction.

36. In combination, a vehicle body, a beater wheel at the rear end of said body, an endless conveyer arranged above the beater wheel, means for moving the contents of the vehicle body toward the rear, and driving connections for causing the inner elements of the beater wheel and of the conveyer to move upwardly while the aforesaid means is moving said contents toward the rear.

37. In combination, a vehicle body open at one end and adapted to support a mass of material to be distributed, a beater wheel extending across said end in the vicinity of the lower regions of said body, an endless rake arranged above said beater wheel, the parts being so constructed and arranged that the inner run of said rake travels upwardly and inwardly from a point beyond the axis of the beater wheel, when the beater wheel is in operation, and means for feeding said mass toward said beater wheel and said rake.

38. In combination, a vehicle body having at one end in the vicinity of the lower regions thereof a beater wheel, a frame arranged across said end above said beater wheel, means for varying the position of said frame, an endless rake extending around said frame and adapted to have its inner run travel upwardly when the beater wheel is in operation, and means for moving the load in said body slowly toward said beater wheel and rake.

39. In combination, a vehicle body adapted to support a mass to be distributed, a distributing device at one end and in the vicinity of the lower regions of said body, means for feeding said entire mass slowly toward said device, means above said device for feeding material from the oncoming mass upwardly toward the top of the mass, and a guard above the last mentioned means to prevent the upwardly-moving material from being carried outwardly.

40. In combination, a vehicle body adapted to support a mass of material to be distributed, a distributing device at one end of said body and in the vicinity of the lower regions thereof, an endless rake arranged above said device, the parts being so constructed and arranged that the inner run of said rake travels in the upward direction when such device is in operation, and a guard extending across the top of said body in the vicinity of said rake.

41. In combination, a vehicle body adapted to support a mass of material to be distributed, a distributing device at one end of said body and in the vicinity of the lower regions thereof, an endless rake arranged above said device, the parts being so constructed and arranged that the inner run of said rake travels in the upward direction when such device is in operation, and a guard extending across the top of said body in the vicinity of said rake, said guard having fingers projecting downwardly into the spaces between the fingers of the rake.

42. The method of distributing a deep mass of loose material which consists in supporting said mass from below and applying a force to the bottom thereof directed toward and adapted to move the mass bodily toward a distributing point, and applying upwardly-directed forces to the upwardly-extending face of the mass at and above said discharge point on the side toward the discharge point at a plurality of different elevations along said face.

43. The method of feeding a deep load of loose fibrous material which consists in carrying it toward a discharge point on a movable support on which it loosely rests and at the same time applying upwardly-directed lifting forces at various elevations on the side or face directed toward the discharge point, so as to tend to rotate the load.

44. The method of feeding a load in a spreader having a distributer at one end of the spreader, which consists in slowly moving the load toward said distributer by a force acting on the bottom of the load and directed toward said end, and at the same time applying to the face of the load above said distributer and at said end a force directed upwardly and having its main component at right angles to the aforesaid force.

In testimony whereof, I sign this specification.

HENRY L. LITCHFIELD.